UNITED STATES PATENT OFFICE.

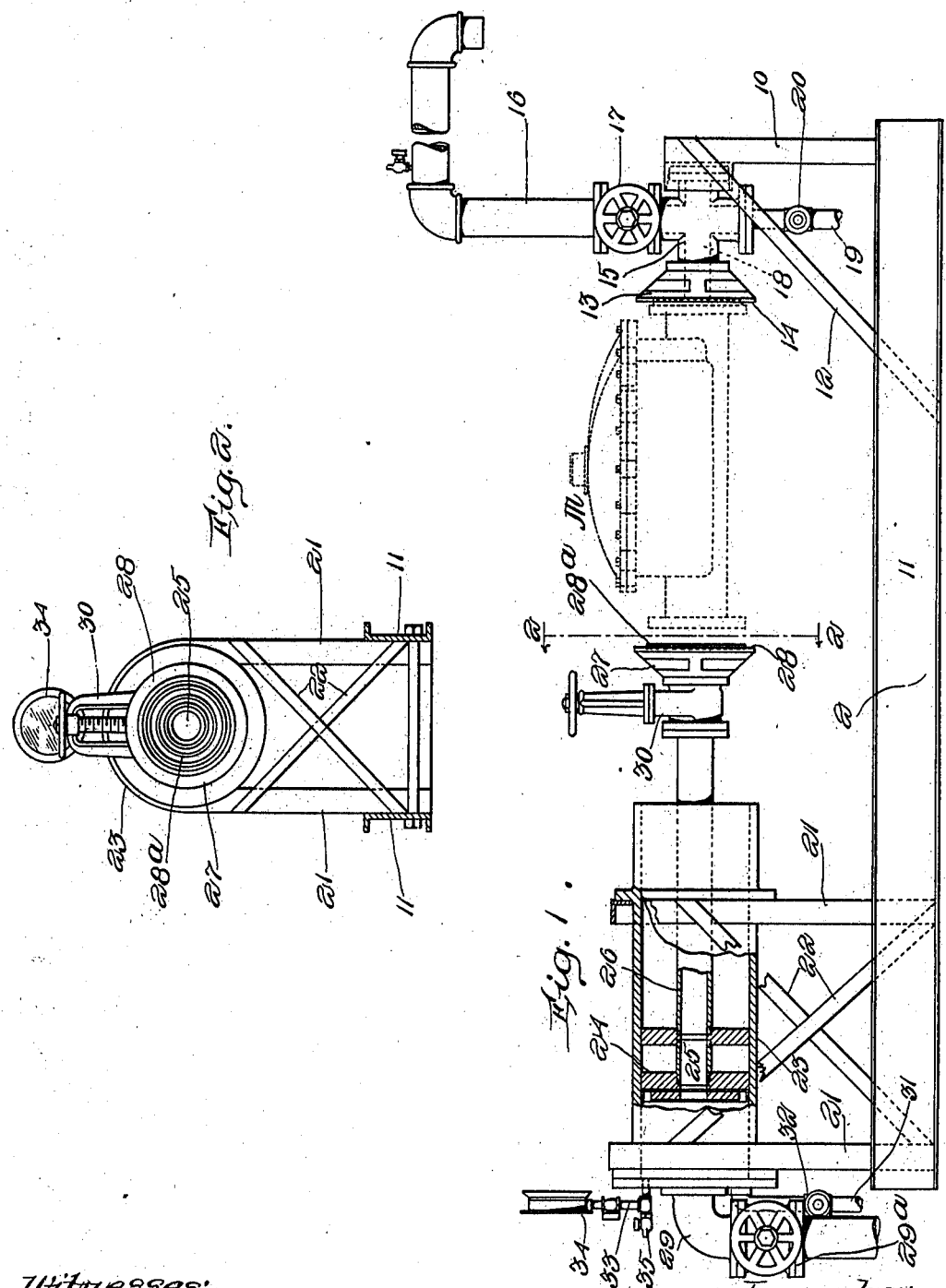

ALBERT B. WOOD, OF NEW ORLEANS, LOUISIANA, ASSIGNOR OF ONE-HALF TO HOWELL C. ERWIN, JR., OF ATLANTA, GEORGIA.

CLAMPING DEVICE.

982,773.

Specification of Letters Patent.   Patented Jan. 24, 1911.

Application filed December 24, 1909. Serial No. 534,872.

*To all whom it may concern:*

Be it known that I, ALBERT BALDWIN WOOD, a citizen of the United States, residing at New Orleans, in the parish of Orleans and State of Louisiana, have invented a new and useful Clamping Device, of which the following is a specification.

In testing different sizes of fluid-measuring instruments, as water-meters, it becomes necessary to furnish fluid-tight joints in a system of piping, the distance between these joints varying with the particular meter to be tested. With the larger sizes, having flange-connections, this operation, as heretofore carried out, has been exceedingly troublesome and wasteful of time, and the present invention is for the purpose of overcoming this difficulty and providing means for temporarily holding a meter in the system, which, while furnishing perfect joints, may be easily and quickly operated both to clamp and release the instrument. Such a device is illustrated in the accompanying drawing, in which—

Figure 1 is a side elevation, with parts broken away, of a portion of a meter-testing system including my invention, and Fig. 2 is a vertical transverse section on the line 2—2 of Fig. 1, looking toward the left.

Throughout the drawing similar characters of reference are applied to like parts.

Upon a standard 10, rising from a base 11 and suitably braced at 12, is secured a head or an abutment 13 having a vertical face 14 adapted to contact with one flange of the meter to be tested. This head may be conveniently connected to the standard by a cross-fitting 15, from the upper arm of which a pipe 16, including a valve 17, continues a discharge-passage 18 through the head. From the lower arm of the fitting a drain-pipe 19 containing a valve 20 is shown as opening.

Spaced from the head 13 upon standards 21, 21 strengthened by intersecting braces 22 is a cylinder 23, in which operates a piston 24, fluid-tight with respect to the cylinder, but contact of its edge with the cylinder, but provided with an axial passage at 25 from which a tubular piston-rod 26 extends through the inner end of the cylinder, and carries in alinement with the fixed head 13 a movable head 27 through which the passage 25 continues. Both the face 14 of the head 13 and the corresponding face 28 of the head 27 preferably have series of concentric packing rings 28$^a$, of such dimensions as to furnish a joint for any meter the device is to hold.

The supply of water to the cylinder and passage 25 is through a pipe 29, of greater diameter than said passage and delivering to the cylinder at the opposite side of the piston from the head 27. In the pipe 29 is a valve 29$^a$, while the discharge from the passage 25 is under the control of a valve 30 situated adjacent to the head. A drain-pipe 31 with a valve 32 opens from the cylinder below the supply-pipe, and in a pipe 33 leading to a gage 34 is an air-cock 35. The gage plays no essential part in my invention, it merely enabling the pressure in the cylinder to be read.

In using the device, the valve 17 being open and this portion of the pipe 16 having been drained through the valve 20, which is thereafter closed, a meter indicated by dotted lines at M in Fig. 1 is placed with its outlet-flange against the proper packing ring of the head 13. Then with the valves 30 and 32 shut and valve 29$^a$ and cock 35 open, water is admitted to the outer end of the cylinder and air expelled therefrom until water appears at the air-cock. This is thereupon closed, and the hydraulic pressure exerts its full force to move the piston along the cylinder and the face 28 of the head 27 against the inlet-flange of the meter M, firmly clamping it in place. There is now a continuous water-tight passage from the supply-pipe 29 to the discharge-pipe 16, and the valve 30 being opened there will be a flow through the meter, which will be recorded by it, into the measuring apparatus by which the test is to be made, for example, a weighing tank. During this time the effective coöperation of the head 27 with the meter is maintained by the excess of pressure upon the piston-surface surrounding the opening of the passage 25.

The desired amount of water having traversed the meter, the valves 17 and 29$^a$ are shut and drain-valve 32 opened. The pressure upon the piston ceases and the meter is released, the movable head being forced back by hand to give sufficient space to introduce the next instrument to be tested.

Having thus described my invention, I claim:

1. A clamping device comprising a movable member provided with a passage, and means whereby fluid-pressure may be applied to the member, the fluid directly coöperating with said member having access to the passage.

2. A clamping device comprising a movable member and a relatively fixed member each provided with a passage, means whereby fluid-pressure may be applied to the movable member, and means for controlling the fluid flow through the passages in the members.

3. In a device for temporarily holding meters, the combination with a movable clamping member and a relatively fixed coöperating member, both members being provided with passages, of means whereby fluid-pressure may be applied to the movable member, said means surrounding the passage therein.

4. In a device for temporarily holding meters, the combination with a movable clamping member and a relatively fixed coöperating member, both members being provided with passages, of means for controlling the entrance to the passage through the movable member, and independent means for controlling the exit from said passage whereby the movement of the clamping device is governed.

5. The combination with a movable clamping head, of a relatively fixed coöperating head provided with a passage, a piston having a tubular connection with the movable head, which connection may also communicate with the passage in the fixed head and a cylinder in which the piston operates, the interior of said cylinder directly communicating with the tubular connection.

6. The combination with a movable clamping head, of a relatively fixed coöperating head, a piston having a tubular connection with the movable head, a cylinder in which the piston operates, means for controlling the admission of fluid to the cylinder, and means for controlling the exit of fluid from the cylinder through the tubular connection and movable head.

7. The combination with a movable clamping head, of a relatively fixed coöperating head, a piston having a tubular connection with the movable head, a cylinder in which the piston operates, means for controlling the admission of fluid to the cylinder, means for controlling the exit of fluid through the tubular connection and movable head, and means for permitting the flow of fluid from the cylinder independently of the exit through the head.

8. The combination with a movable clamping head, of a relatively fixed coöperating head, a piston having a tubular connection with the movable head, a cylinder in which the piston operates, means for controlling the admission of the fluid to the cylinder, and means traveling with the movable head for controlling the flow of fluid therethrough.

9. A clamping device for meters comprising a fixed head provided with a passage, a cylinder, a piston and piston-rod, a head carried by the piston-rod for coöperation with the fixed head, there being a passage through the piston, piston-rod and movable head, and a supply-pipe delivering to the cylinder at the side of the piston opposite the movable head.

10. A clamping device for meters comprising a fixed head provided with a passage, a cylinder, a piston and piston-rod, a head carried by the piston-rod for coöperation with the fixed head, there being a passage through the piston, piston-rod and movable head, a supply-pipe delivering to the cylinder at the side of the piston opposite the movable head, a valve in the supply pipe, and a valve associated with the movable head.

11. A clamping device for meters comprising a fixed head provided with a passage, a cylinder, a piston operating in the cylinder, a piston-rod, a head carried by the piston-rod for coöperation with the fixed head, there being a passage through the piston, piston-rod and movable head, a supply-pipe delivering to the cylinder at the side of the piston opposite the movable head, a valve in the supply-pipe, a valve associated with the movable head, and a valve for draining the cylinder at the supply-side of the piston.

Signed at New Orleans, in the parish of Orleans and State of Louisiana, this 13th day of December, 1909.

A. B. WOOD.

Witnesses:
JOHN D. MILLER,
BURT W. HENRY.